（12）United States Patent
Zhang et al.

(10) Patent No.: US 10,581,504 B2
(45) Date of Patent: Mar. 3, 2020

(54) BEAMFORMING METHOD, RECEIVER, TRANSMITTER, AND SYSTEM

(71) Applicant: HUAWEI TECHNOLOGIES CO., LTD., Shenzhen, Guangdong (CN)

(72) Inventors: Zhiwei Zhang, Shanghai (CN); Shanchun Xia, Shenzhen (CN); Mo Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/023,316

(22) Filed: Jun. 29, 2018

(65) Prior Publication Data

US 2018/0309487 A1    Oct. 25, 2018

Related U.S. Application Data

(63) Continuation of application No. PCT/CN2015/100144, filed on Dec. 31, 2015.

(51) Int. Cl.
*H04B 7/04* (2017.01)
*H04B 7/06* (2006.01)
*H04B 7/08* (2006.01)

(52) U.S. Cl.
CPC ............ *H04B 7/0617* (2013.01); *H04B 7/04* (2013.01); *H04B 7/0634* (2013.01); *H04B 7/0834* (2013.01); *H04B 7/0848* (2013.01)

(58) Field of Classification Search
CPC .. H04B 7/0617; H04B 7/0834; H04B 7/0634; H04B 7/04
See application file for complete search history.

(56) References Cited

U.S. PATENT DOCUMENTS 7,257,425 B2 *  8/2007  Wang ................... H04B 7/0615
                                                    455/561
8,170,132 B2 *  5/2012  Yang ................... H04B 7/0617
                                                    375/260

(Continued)

FOREIGN PATENT DOCUMENTS

CA    3010228 A1 *  7/2017  ............... H04B 7/04
CN    1503491 A      6/2004

(Continued)

OTHER PUBLICATIONS

International Search Report dated Sep. 9, 2016 in corresponding International Patent Application No. PCT/CN2015/100144.

(Continued)

*Primary Examiner* — Berhanu Tadese
(74) *Attorney, Agent, or Firm* — Womble Bond Dickinson (US) LLP

(57) ABSTRACT

Embodiments of the present invention disclose a beamforming method, a receiver, a transmitter, and a system. The beamforming method includes: controlling, according to a preset rule, connection or disconnection of N analog channels corresponding to N antenna array elements, to obtain an independently received equivalent signal at each of the N antenna array elements, where N is a natural number greater than or equal to 2; obtaining, based on the independently received equivalent signal at each of the N antenna array elements, a beamforming weight; and sending the beamforming weight to a transmitter. According to the embodiments of the present invention, costs can be reduced, and relatively good interference suppression performance can be obtained.

10 Claims, 7 Drawing Sheets

(56) References Cited

U.S. PATENT DOCUMENTS

| | | | | |
|---|---|---|---|---|
| 8,542,555 | B1* | 9/2013 | Uzes | G01S 3/143 |
| | | | | 367/87 |
| 8,630,267 | B1* | 1/2014 | Jin | H04W 16/28 |
| | | | | 370/252 |
| 9,271,176 | B2* | 2/2016 | Chen | H04W 24/10 |
| 9,711,853 | B2* | 7/2017 | Foo | H01Q 1/246 |
| 9,921,258 | B2* | 3/2018 | Schwager | G01R 27/28 |
| 9,941,945 | B2* | 4/2018 | Kim | H04B 7/0421 |
| 10,128,817 | B2* | 11/2018 | Qian | H03H 11/20 |
| 10,128,894 | B1* | 11/2018 | O'Brien | H04B 17/14 |
| 2003/0160720 | A1* | 8/2003 | Maceo | G01S 13/4463 |
| | | | | 342/373 |
| 2005/0184906 | A1* | 8/2005 | Nakaya | H01Q 3/2605 |
| | | | | 342/377 |
| 2007/0037528 | A1* | 2/2007 | Doan | H04B 7/0615 |
| | | | | 455/101 |
| 2008/0240031 | A1* | 10/2008 | Nassiri-Toussi | H04B 7/0408 |
| | | | | 370/329 |
| 2009/0033555 | A1* | 2/2009 | Niu | H01Q 3/26 |
| | | | | 342/372 |
| 2009/0061795 | A1* | 3/2009 | Doan | H03D 7/163 |
| | | | | 455/91 |
| 2009/0239565 | A1 | 9/2009 | Han et al. | |
| 2009/0323563 | A1* | 12/2009 | Ho | H04B 7/061 |
| | | | | 370/280 |
| 2009/0325508 | A1* | 12/2009 | Cho | H04W 99/00 |
| | | | | 455/74 |
| 2009/0327467 | A1* | 12/2009 | Cho | H04L 67/16 |
| | | | | 709/223 |
| 2011/0044402 | A1* | 2/2011 | Yang | H04B 7/0617 |
| | | | | 375/295 |
| 2011/0122026 | A1* | 5/2011 | DeLaquil | H01Q 3/2682 |
| | | | | 342/372 |
| 2011/0291891 | A1* | 12/2011 | Nsenga | H04B 7/0617 |
| | | | | 342/373 |
| 2013/0171998 | A1* | 7/2013 | Liu | H04W 16/28 |
| 2013/0185006 | A1* | 7/2013 | Schwager | G01R 27/28 |
| | | | | 702/58 |
| 2013/0202054 | A1* | 8/2013 | Khan | H01Q 3/26 |
| | | | | 375/259 |
| 2013/0244594 | A1* | 9/2013 | Alrabadi | H04B 7/0413 |
| | | | | 455/78 |
| 2013/0286960 | A1* | 10/2013 | Li | H04W 72/042 |
| | | | | 370/329 |
| 2013/0301454 | A1* | 11/2013 | Seol | H04B 7/043 |
| | | | | 370/252 |
| 2014/0192914 | A1* | 7/2014 | Liu | H04B 7/0617 |
| | | | | 375/260 |
| 2015/0244387 | A1* | 8/2015 | Fleishman | H03M 1/201 |
| | | | | 341/131 |
| 2015/0281993 | A1* | 10/2015 | Chen | H04W 24/10 |
| | | | | 370/338 |
| 2015/0334726 | A1* | 11/2015 | Gao | H04B 7/04 |
| | | | | 370/330 |
| 2016/0011305 | A1* | 1/2016 | Koptenko | G10K 11/341 |
| | | | | 367/7 |
| 2016/0119910 | A1* | 4/2016 | Krzymien | H04B 7/0639 |
| | | | | 370/329 |
| 2016/0315680 | A1* | 10/2016 | Braun | H04B 7/0617 |
| 2016/0323757 | A1* | 11/2016 | Braun | H04B 7/0617 |
| 2016/0329631 | A1* | 11/2016 | Rheinfelder | H01Q 1/246 |
| 2017/0063503 | A1* | 3/2017 | Liu | H04L 5/0044 |
| 2017/0078001 | A1* | 3/2017 | Kim | H04B 7/0871 |
| 2017/0078069 | A1* | 3/2017 | Jia | H04W 72/04 |
| 2017/0134079 | A1* | 5/2017 | Kim | H04B 7/0421 |
| 2017/0163326 | A1* | 6/2017 | Kim | H04B 7/06 |
| 2017/0201980 | A1* | 7/2017 | Hakola | H04W 72/0446 |
| 2017/0238341 | A1* | 8/2017 | Liu | H04W 56/00 |
| | | | | 370/336 |
| 2017/0257155 | A1* | 9/2017 | Liang | H04B 7/0695 |
| 2017/0272223 | A1* | 9/2017 | Kim | H04B 7/0617 |
| 2017/0273009 | A1* | 9/2017 | Wang | H04W 48/02 |
| 2017/0302348 | A1* | 10/2017 | Reinhardt | H04B 7/0691 |
| 2017/0346575 | A1* | 11/2017 | Tang | H04B 17/12 |
| 2017/0373391 | A1* | 12/2017 | Aoki | H04B 1/10 |
| 2018/0003819 | A1* | 1/2018 | Koptenko | G01S 7/52025 |
| 2018/0007678 | A1* | 1/2018 | Costa | H04W 72/046 |
| 2018/0026607 | A1* | 1/2018 | Le Meur | G06F 17/18 |
| | | | | 708/308 |
| 2018/0048375 | A1* | 2/2018 | Guo | H04B 7/088 |
| 2018/0062722 | A1* | 3/2018 | Su | H04B 7/06 |
| 2018/0103433 | A1* | 4/2018 | Li | H04W 52/325 |
| 2018/0115957 | A1* | 4/2018 | Lin | H04W 52/365 |
| 2018/0131425 | A1* | 5/2018 | Li | H04B 7/088 |
| 2018/0132197 | A1* | 5/2018 | Lin | H04W 52/242 |
| 2018/0160298 | A1* | 6/2018 | Wang | H04W 4/70 |
| 2018/0198511 | A1* | 7/2018 | Maamari | H04B 7/0695 |
| 2018/0198582 | A1* | 7/2018 | Andersson | H04L 5/0007 |
| 2018/0198583 | A1* | 7/2018 | Lin | H04B 7/0695 |
| 2018/0199360 | A1* | 7/2018 | Lin | H04W 72/1268 |
| 2018/0205437 | A1* | 7/2018 | Kim | H04B 7/06 |
| 2018/0212651 | A1* | 7/2018 | Li | H04B 7/0695 |
| 2018/0227928 | A1* | 8/2018 | Kim | H04L 5/0048 |
| 2018/0262244 | A1* | 9/2018 | Noh | H04B 7/0469 |
| 2018/0269953 | A1* | 9/2018 | Kang | H04B 7/0408 |
| 2018/0270844 | A1* | 9/2018 | Kim | H04B 7/04 |
| 2018/0302175 | A1* | 10/2018 | Yuan | H01Q 21/00 |
| 2018/0309487 | A1* | 10/2018 | Zhang | H04B 7/04 |
| 2018/0309553 | A1* | 10/2018 | Cao | H04L 5/0048 |
| 2018/0343044 | A1* | 11/2018 | Athley | H04B 7/0417 |
| 2018/0343687 | A1* | 11/2018 | Nillsson | H04W 16/28 |
| 2019/0123948 | A1* | 4/2019 | Zhao | H04B 7/04 |

FOREIGN PATENT DOCUMENTS

| | | | | |
|---|---|---|---|---|
| CN | 101488792 | A | 7/2009 | |
| CN | 101562504 | A | 10/2009 | |
| CN | 102013908 | A | 4/2011 | |
| CN | 102545981 | A | 7/2012 | |
| CN | 102905285 | A | 1/2013 | |
| CN | 104980206 | A | 10/2015 | |
| EP | 2246937 | B1 | 8/2015 | |
| KR | 20080025879 | A | 3/2008 | |
| WO | WO-2006026890 | A1 * | 3/2006 | H04B 7/0408 |
| WO | WO-2017113301 | A1 * | 7/2017 | H04B 7/04 |

OTHER PUBLICATIONS

International Search Report, dated Sep. 9, 2016, in International Application No. PCT/CN2015/100144 (4 pp.).

* cited by examiner

BEAMFORMING METHOD, RECEIVER, TRANSMITTER, AND SYSTEM

CROSS-REFERENCE TO RELATED APPLICATIONS

This application is a continuation of International Application No. PCT/CN2015/100144, filed on Dec. 31, 2015, the disclosure of which is hereby incorporated by reference in its entirety.

TECHNICAL FIELD

The present invention relates to the field of mobile communications technologies, and in particular, to a beamforming method, a receiver, a transmitter, and a system.

BACKGROUND

Continuous development of wireless communications technologies poses increasingly high requirements on network capacity and network coverage, and more requires related communications devices to meet requirements of low costs and strong environmental adaptability. In addition, backhaul (backhaul) systems between base stations and between a base station and a core network, especially a wireless backhaul system between base stations (shown in FIG. 1), have extremely high requirements on transmission reliability, and are faced with greater challenges due to channel complexity in a wireless transmission environment. Therefore, the industry gradually analyzes and applies a multi-antenna array beamforming (beamforming) technology to a wireless backhaul (backhaul) system device, so as to further expand space-domain freedom and obtain an interference suppression capability by using the beamforming technology.

Beamforming is a signal processing technology. In this technology, an antenna array is formed by using a plurality of antenna array elements, and weighting processing is separately performed on signals at each antenna array element by using an advanced signal processing algorithm, so that the antenna array is aligned with a direction of a wanted signal in real time, and a directional-null antenna is formed in an interference direction to suppress an interference signal, thereby increasing a signal-to-noise ratio and improving system performance.

Currently, a commonly used beamforming method includes analog beamforming (analog beamforming, ABF) or digital beamforming (digital beamforming, DBF). A specific implementation architecture in a DBF solution is shown in FIG. 2a, and a specific implementation architecture in an ABF solution is shown in FIG. 2b.

When the beamforming technology is applied to a wireless communications backhaul system, it is found that in the DBF solution, independent signal streams $R_1(n)$ to $R_N(n)$ at each antenna array element can be obtained, so that a beamforming weight can be adaptively obtained according to signal characteristics of each antenna array element, to perform beamforming. Therefore, relatively good interference suppression performance can be obtained. However, the DBF solution requires that each antenna array element should have an independent digital signal processing channel, that is, signals received and transmitted by each antenna array element are required to be processed by an independent digital to analog converter (digital to analog converter, DAC) and an independent analog to digital converter (analog to digital converter, ADC) before the signals are transmitted to a digital side. As a result, costs are relatively high, a structure is difficult to implement. Therefore, the DBF solution is difficult to be widely applied to backhaul systems. In the ABF solution, each antenna array element does not have an independent digital signal processing channel, but instead analog signals are combined by using a combiner or analog signals are distributed by using a power splitter. Therefore, the ABF solution has significant cost advantages and a simple architecture. However, because in the ABF solution, there is no independent DAC or ADC between each antenna array element and a digital side, a receive end receives superimposed signals $r(n)$ from a plurality of antenna array elements, and an independent signal stream at each antenna array element cannot be obtained. As a result, a beamforming weight cannot be adaptively obtained according to signal characteristics of each antenna array element, and beamforming can be performed only by using a preset beamforming weight. This leads to relatively poor interference suppression performance, and therefore the ABF solution is also difficult to be widely applied to backhaul systems.

SUMMARY

In view of this, embodiments of the present invention provide a beamforming method, a receiver, a transmitter, and a system, which can reduce costs and obtain relatively good interference suppression performance, and can be widely applied to backhaul systems.

According to a first aspect, a beamforming method provided in an embodiment of the present invention includes:

controlling, according to a preset rule, connection or disconnection of N analog channels corresponding to N antenna array elements, to obtain an independently received equivalent signal at each of the N antenna array elements, where N is a natural number greater than or equal to 2;

obtaining, based on the independently received equivalent signal at each of the N antenna array elements, a beamforming weight; and sending the beamforming weight to a transmitter.

With reference to the first aspect, in a first implementation of the first aspect, the method further includes:

receiving a communications signal from the transmitter, where the communications signal is a communications signal on which beamforming processing is performed by using the beamforming weight; and performing, by using the beamforming weight, beamforming processing on the communications signal received by the N antenna array elements.

With reference to the first aspect or the first implementation of the first aspect, in a second implementation of the first aspect, the preset rule includes: first connecting the N analog channels, and then disconnecting a preset quantity of analog channels in sequence, where the preset quantity is less than N.

With reference to the second implementation of the first aspect, in a third implementation of the first aspect, a complete superimposed signal stream is obtained when the N analog channels are connected, a default superimposed signal stream is obtained when the preset quantity of analog channels are disconnected, and the obtaining an independently received equivalent signal at each of the N antenna array elements includes:

obtaining the independently received equivalent signal at each of the N antenna array elements by calculating a difference between the complete superimposed signal stream and each default superimposed signal stream.

With reference to the second or the third implementation of the first aspect, in a fourth implementation of the first aspect, the preset quantity is 1.

With reference to the first aspect, or the first, the second, the third, or the fourth implementation of the first aspect, in a fifth implementation of the first aspect, a connectivity control circuit is disposed on each of the N analog channels.

According to a second aspect, a beamforming method provided in an embodiment of the present invention includes:

receiving a second beamforming weight sent by a receiver;

performing beamforming processing on a to-be-sent communications signal by using the second beamforming weight; and sending, by using N antenna array elements, the communications signal processed by using the second beamforming weight, where N is a natural number greater than or equal to 2.

With reference to the second aspect, in a first implementation of the second aspect, before the receiving a second beamforming weight sent by a receiver, the method further includes:

performing beamforming processing on the to-be-sent communications signal by using a first beamforming weight; and sending, by using the N antenna array elements, the communications signal processed by using the first beamforming weight.

According to a third aspect, a receiver provided in an embodiment of the present invention includes:

a channel control unit, configured to control, according to a preset rule, connection or disconnection of N analog channels corresponding to N antenna array elements, to obtain an independently received equivalent signal at each of the N antenna array elements, where N is a natural number greater than or equal to 2;

a weight obtaining unit, configured to obtain, based on the independently received equivalent signal at each of the N antenna array elements, a beamforming weight; and a sending unit, configured to send the beamforming weight to a transmitter.

With reference to the third aspect, in a first implementation of the third aspect, the receiver further includes:

a receiving unit, configured to receive a communications signal from the transmitter, where the communications signal is a communications signal on which beamforming processing is performed by using the beamforming weight; and a processing unit, configured to perform, by using the beamforming weight, beamforming processing on the communications signal received by the N antenna array elements.

With reference to the third aspect or the first implementation of the third aspect, in a second implementation of the third aspect, the preset rule includes: first connecting the N analog channels, and then disconnecting a preset quantity of analog channels in sequence, where the preset quantity is less than N.

With reference to the second implementation of the third aspect, in a third implementation of the third aspect, a complete superimposed signal stream is obtained when the N analog channels are connected, a default superimposed signal stream is obtained when the preset quantity of analog channels are disconnected, and the obtaining, by the channel control unit, an independently received equivalent signal at each of the N antenna array elements includes:

obtaining, by the channel control unit, the independently received equivalent signal at each of the N antenna array elements by calculating a difference between the complete superimposed signal stream and each default superimposed signal stream.

With reference to the second or the third implementation of the third aspect, in a fourth implementation of the third aspect, the preset quantity is 1.

With reference to the third aspect, or the first, the second, the third, or the fourth implementation of the third aspect, in a fifth implementation of the third aspect, a connectivity control circuit is disposed on each of the N analog channels.

According to a fourth aspect, a transmitter provided in an embodiment of the present invention includes:

a receiving unit, configured to receive a second beamforming weight sent by a receiver;

a processing unit, configured to perform beamforming processing on a to-be-sent communications signal by using the second beamforming weight; and a sending unit, configured to send, by using N antenna array elements, the communications signal processed by using the second beamforming weight, where N is a natural number greater than or equal to 2.

With reference to the fourth aspect, in a first implementation of the fourth aspect, the processing unit is further configured to: before the receiving unit receives the second beamforming weight sent by the receiver, perform beamforming processing on the to-be-sent communications signal by using a first beamforming weight; and the sending unit is further configured to send, by using the N antenna array elements, the communications signal processed by using the first beamforming weight.

According to a fifth aspect, an embodiment of the present invention provides a communications system, including a first communications device including the receiver according to the third aspect or any implementation of the third aspect, and/or a second communications device including the transmitter according to the fourth aspect or any implementation of the fourth aspect.

It can be seen from the foregoing technical solution that the embodiments of the present invention have the following advantages.

In the embodiments of the present invention, the independently received equivalent signal at each antenna array element can be obtained by controlling connection or disconnection of the analog channel corresponding to each antenna array element. Therefore, an independent digital signal processing channel does not need to be disposed for each antenna array element, and costs are reduced. The beamforming weight is obtained based on the independently received equivalent signal at each antenna array element, and is used. Therefore, relatively good interference suppression performance can be obtained.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes technical solutions in embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
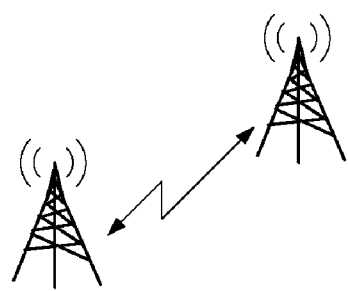
FIG. 1 is a schematic diagram of a wireless communications backhaul system.
Figure 2A:
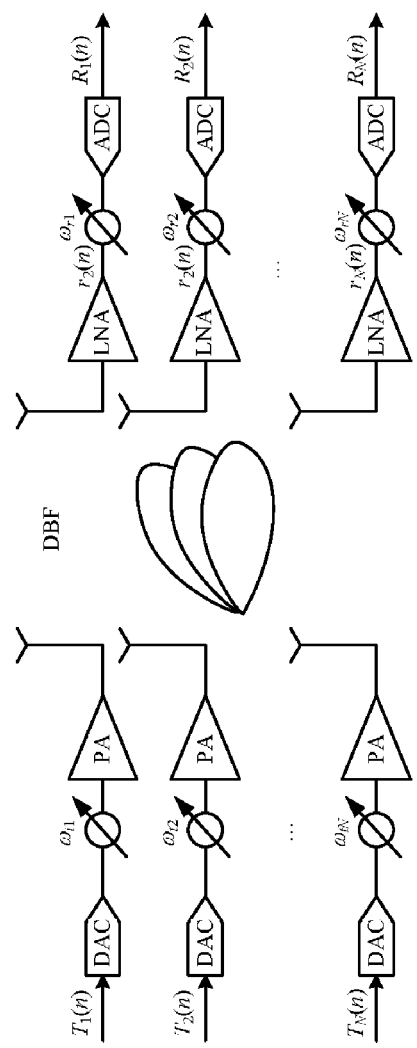
FIG. 2a is a schematic diagram of a specific implementation of a DBF solution in the prior art.
Figure 2B:
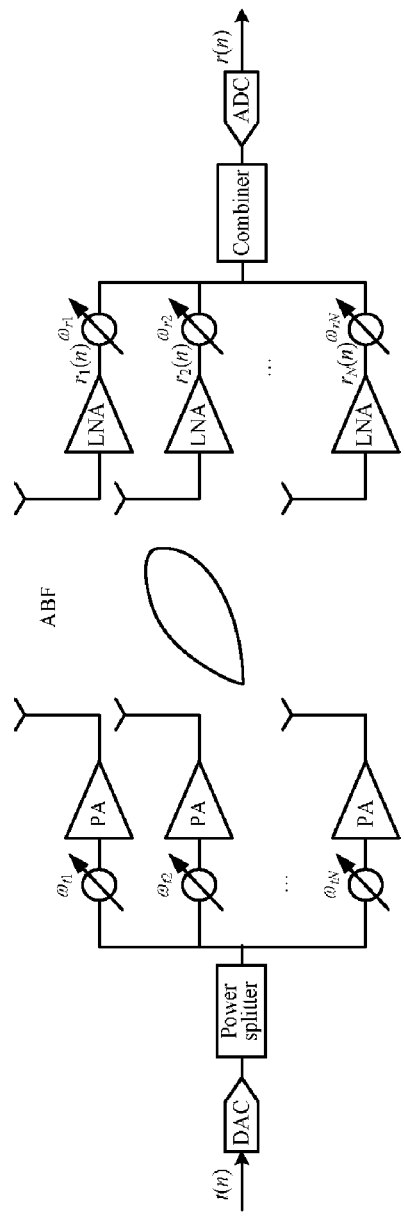
FIG. 2b is a schematic diagram of a specific implementation of an ABF solution in the prior art.

It can be learned from the background description that in a backhaul system, if a DBF solution is used to implement beamforming, relatively good interference suppression performance can be obtained, but implementation costs are high; if an ABF solution is used to implement beamforming, costs can be reduced, but relatively good interference suppression performance cannot be obtained. Therefore, the embodiments of the present invention provide a beamforming method, so as to reduce costs and obtain relatively good interference suppression performance. The beamforming method provided in the embodiments of the present invention can be applied to a wireless communications backhaul system shown in FIG. 1. Certainly, the beamforming method provided in the embodiments of the present invention can also be applied to another communications system, for example, to a low-speed mobile communications system (such as an indoor coverage communications system). This is not specifically limited herein.

Figure 3:
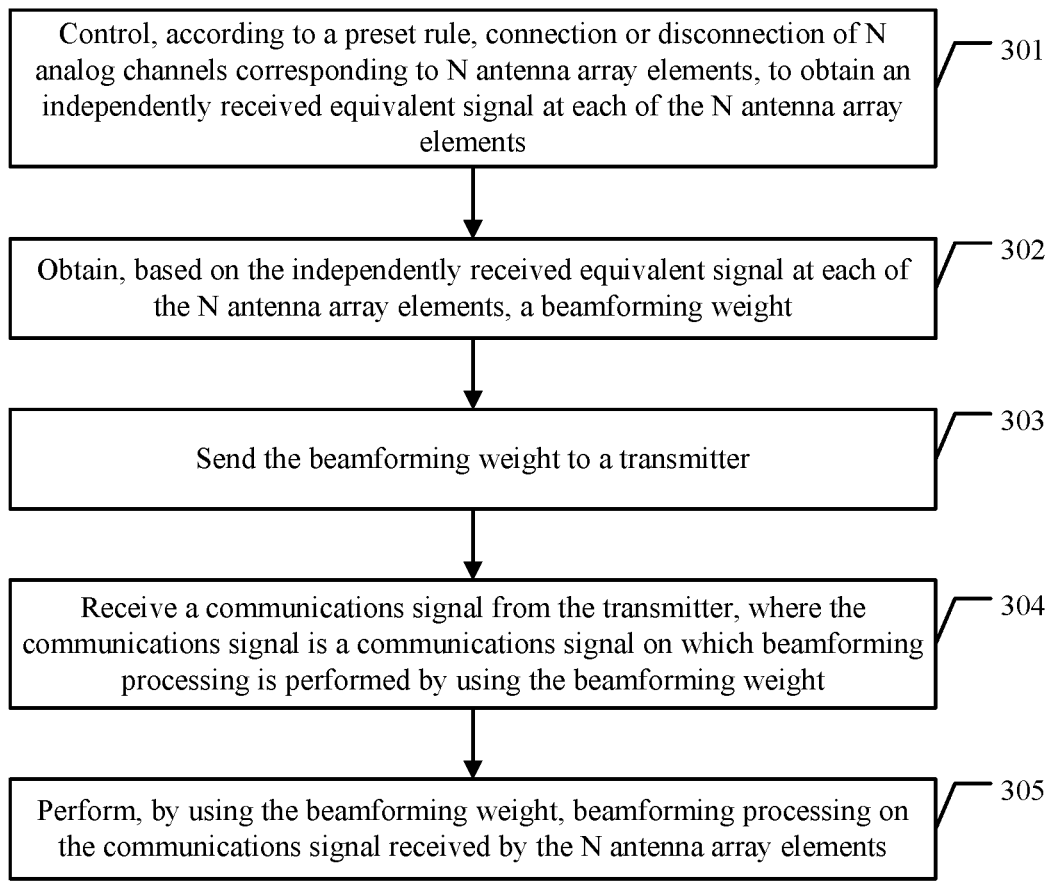
FIG. 3 is a schematic flowchart of a beamforming method according to an embodiment of the present invention.

Referring to FIG. 3, FIG. 3 is a schematic flowchart of a beamforming method according to an embodiment of the present invention. The method may be implemented in a receiver, and the method in this embodiment includes the following steps.

301: Control, according to a preset rule, connection or disconnection of N analog channels corresponding to N antenna array elements, to obtain an independently received equivalent signal at each of the N antenna array elements, where N is a natural number greater than or equal to 2.

In this embodiment of the present invention, the antenna array element is an independent unit of a radio-electromagnetic-wave-signal radiating and receiving apparatus, and may be a dipole antenna (dipole), a patch antenna (patch), or another type of antenna. This is not specifically limited herein. A plurality of such antenna array elements are arranged by space and feed according to a specific requirement, so as to form an antenna array.

In the receiver, the N analog channels corresponding to the N antenna array elements are N analog receive channels. On each analog receive channel, at least one of a radio frequency demodulator, a low noise amplifier (low noise amplifier, LNA), or a filter may be included.

In specific implementation, in an ABF architecture, a connectivity control circuit may be disposed on an analog channel corresponding to each antenna array element. For example, an on/off control circuit or another equivalent control circuit is disposed. Each analog channel is controlled to be connected or disconnected by controlling the connectivity control circuit disposed on each analog channel.

The preset rule may include: first connecting the N analog channels, and then disconnecting a preset quantity of analog channels in sequence. According to this preset rule, a complete superimposed signal stream (that is, a superimposed stream of N received signals) may be obtained when the N analog channels are connected, a default superimposed signal stream (that is, a superimposed stream excluding a preset quantity of received signals) may be obtained when the preset quantity of analog channels are disconnected, and a plurality of default superimposed signal streams may be obtained by disconnecting the preset quantity of analog channels in sequence. The independently received equivalent signal at each of the N antenna array elements can be obtained by calculating a difference between the complete superimposed signal stream and each default superimposed signal stream.

The preset quantity is a natural number greater than or equal to 1 and less than or equal to M, where M is far less than N, and a value of M must ensure that impact on a signal-to-noise ratio of a received signal is within an acceptable scope.

Preferably, a value of the preset quantity is 1, so that during the entire process, the other N−1 signals can be normally received, and a system loss is minimized.

Specifically, when the preset quantity is 1, a method for obtaining the independently received equivalent signal at each antenna array element may be: first connecting all analog channels to obtain a superimposed stream of received signals at the N antenna array elements, that is, the complete superimposed signal stream; then disconnecting one analog channel in sequence until the N analog channels are traversed, where each time one analog channel is disconnected, one superimposed stream excluding a received signal at an antenna array element corresponding to the analog channel may be obtained, that is, one default superimposed signal stream may be obtained, and by analogy, N default superimposed signal streams may be obtained; and obtaining the independently received equivalent signal at each antenna array element by separately calculating a difference between the complete superimposed signal stream and each of the N default superimposed signal streams.

302: Obtain, based on the independently received equivalent signal at each of the N antenna array elements, a beamforming weight.

For a method for obtaining, based on the independently received equivalent signal at each antenna array element, the beamforming weight, reference may be made to the prior art. For example, after the independently received equivalent signal at each antenna array element is obtained, a method for obtaining a beamforming weight according to an independently received signal at each antenna array element in the DBF solution may be used to obtain the beamforming weight. Details about the specific obtaining method are not described herein again. The obtained beamforming weight may be a weight set, and the weight set includes the beamforming weight corresponding to each antenna array element.

303: Send the beamforming weight to a transmitter.

A specific method for sending the beamforming weight to the transmitter may still be a method for sending a beamforming weight in a closed-loop ABF solution in the prior art, and details are not described herein again.

304: Receive a communications signal from the transmitter, where the communications signal is a communications signal on which beamforming processing is performed by using the beamforming weight.

305: Perform, by using the beamforming weight, beamforming processing on the communications signal received by the N antenna array elements.

That is, after the beamforming weight is obtained according to the independently received equivalent signal at each antenna array element, the receiver sends the beamforming weight to the transmitter. The transmitter performs beamforming processing on the communications signal by using the beamforming weight, and sends the processed communications signal to the receiver. After receiving the communications signal from the transmitter, the receiver also performs beamforming processing on the received communications signal by using the beamforming weight. Both the transmit end and the receive end use the beamforming weight, implementing optimal pairing for transmit and receive signal beamforming.

In this embodiment, the independently received equivalent signal at each antenna array element may be obtained by controlling connection or disconnection of the analog channel corresponding to each antenna array element. Therefore, an independent digital signal processing channel does not need to be disposed for each antenna array element, and costs are reduced. The beamforming weight is obtained based on the independently received equivalent signal at each antenna array element, and beamforming processing is performed, by using the obtained beamforming weight, on a communications signal received at each antenna array element. Therefore, relatively good interference suppression performance can be obtained.

Figure 4:
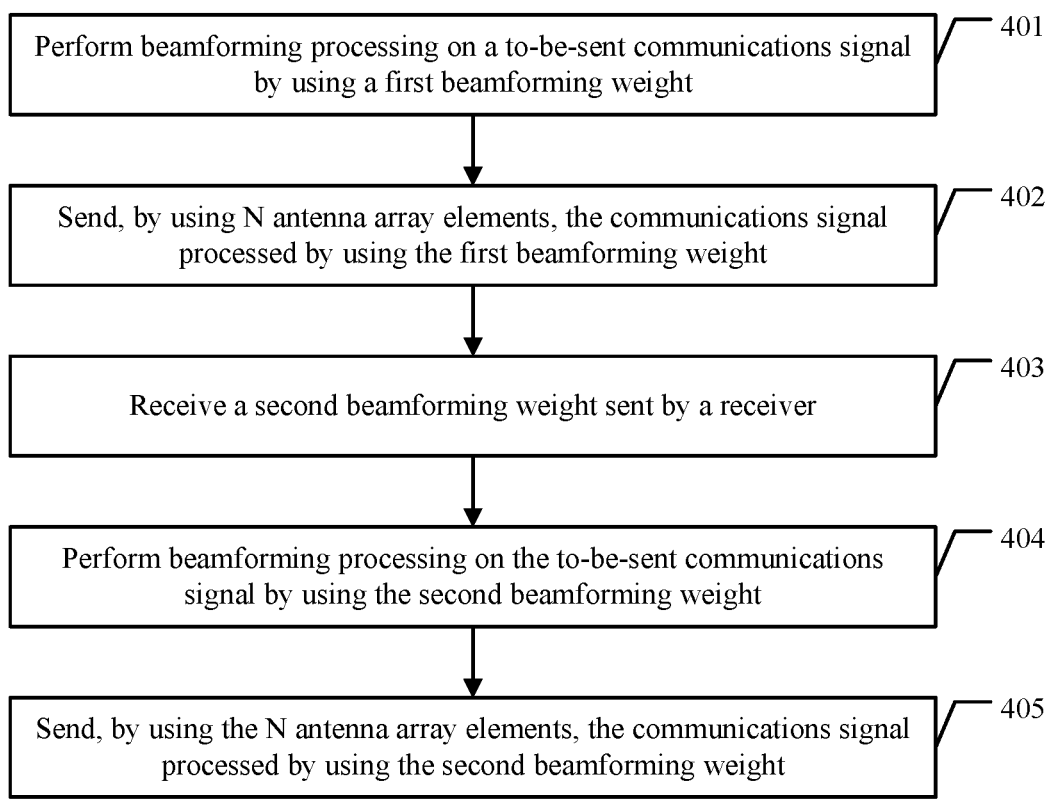
FIG. 4 is another schematic flowchart of a beamforming method according to an embodiment of the present invention.

FIG. 4 is another schematic flowchart of a beamforming method according to an embodiment of the present invention. The method may be implemented in a transmitter, and the method in this embodiment includes the following steps.

401: Perform beamforming processing on a to-be-sent communications signal by using a first beamforming weight.

The first beamforming weight is a preset group of default beamforming weights.

402: Send, by using N antenna array elements, the communications signal processed by using the first beamforming weight, where N is a natural number greater than or equal to 2.

In the transmitter, the N antenna array elements are also corresponding to N analog channels. The N analog channels are N analog transmit channels, and at least one of a radio frequency modulator, a power amplifier (power amplifier, PA), a filter, or the like is included on each analog transmit channel. This is not limited herein.

403: Receive a second beamforming weight sent by a receiver.

The second beamforming weight is a beamforming weight set obtained by the receiver according to an independently received equivalent signal at each antenna array element. For a specific obtaining method, refer to descriptions of the foregoing embodiment, and details are not described herein again. A specific method for receiving the second beamforming weight sent by the receiver may still be a method for receiving a beamforming weight in a closed-loop ABF solution in the prior art.

404: Perform beamforming processing on the to-be-sent communications signal by using the second beamforming weight.

405: Send, by using the N antenna array elements, the communications signal processed by using the second beamforming weight.

In this embodiment, the transmitter may receive the second beamforming weight sent by the receiver, and perform beamforming processing on the to-be-sent communications signal by using the second beamforming weight. The second beamforming weight is obtained by the receiver based on the independently received equivalent signal at each antenna array element, where the independently received equivalent signal at each antenna array element is obtained by the receiver by controlling connection or disconnection of the analog channel corresponding to each antenna array element. Therefore, an independent digital signal processing channel does not need to be disposed for each antenna array element. This reduces costs and can improve interference suppression performance.

Figure 5:
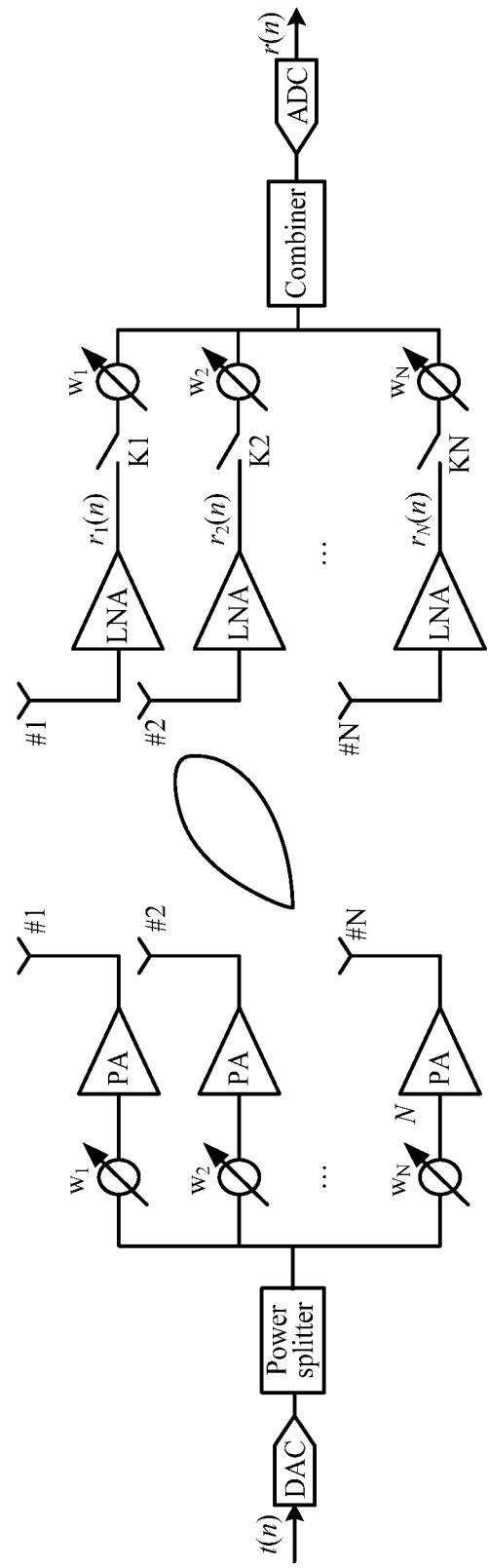
FIG. 5 is a schematic diagram of a specific implementation of an antenna system according to an embodiment of the present invention.

FIG. 5 is a schematic diagram of a specific implementation of a communications system according to an embodiment of the present invention. The communications system in this embodiment of the present invention may include a first communications device and a second communications device. The first communications device may include a receiver that is configured to implement the beamforming method in the embodiment corresponding to FIG. 3. Certainly, the first communications device may further include a transmitter. The second communications device may include a transmitter that is configured to implement the beamforming method in the embodiment corresponding to FIG. 4. Certainly, the second communications device may further include a receiver. The first communications device and the second communications device may be base stations, terminals, or other devices. The transmitter and the receiver mentioned in the following embodiments are a transmitter and a receiver existing in different communications devices.

The transmitter may transmit a signal by using a plurality of antenna array elements, and the receiver may receive a signal by using a plurality of antenna array elements. In the receiver, a switch may be disposed on an analog channel corresponding to each antenna array element. In this embodiment, both a quantity of antenna array elements at a receive end and a quantity of antenna array elements at a transmit end may be N (#1 to #N), and N is a natural number greater than or equal to 2.

In the transmitter, a digital signal t(n) is converted into an analog signal by a DAC, and the analog signal is divided into N analog signals by a power splitter. Each analog signal undergoes beamforming processing and amplification processing by a PA (the beamforming processing may be performed before or after the amplification processing by the PA), and then is transmitted by using the N antenna array elements. In the receiver, when N switches are all turned on, N signals may be received by using the N antenna array elements, and amplification processing is performed on the N signals by using an LNA, to obtain signals $r_1(n)$ to $r_N(n)$. Next, beamforming processing is performed on the N signals (the beamforming processing may alternatively be performed before the amplification processing by the LNA), and the N signals are combined into one signal by using a combiner. The signal is converted into a digital signal r(n) by an ADC, and r(n) is a complete superimposed signal stream. When a preset quantity of switches in the N switches are controlled to be turned off in sequence, a default superimposed signal stream excluding the preset quantity of signals may be obtained. An independently received equivalent signal at each of the N antenna array elements can be obtained by calculating a difference between the complete superimposed signal stream and each default superimposed signal stream.

In this embodiment of the present invention, a timeslot in which the receiver controls the N switches to be turned off in sequence may be within a timeslot in which a reference pilot signal is transmitted or within a timeslot in which a normal communications signal is transmitted. This is not specifically limited herein.

The following specific embodiment describes a method for implementing beamforming by using the foregoing communications system. Referring to FIG. 5, descriptions are provided by using an example in which a preset rule is first connecting N analog channels, and then disconnecting one analog channel in sequence.

In a backhaul system, a wireless channel between a transmit end and a receive end is a relatively slowly changing environment. It may be considered that the wireless channel between the transmit end and the receive end is stable within N+1 transmission frames, and a reference pilot signal is inserted into a start timeslot of each frame during transmission.

When the transmit end and the receive end are powered on and initialized, a preset group of default beamforming weights ($w_1$ to $w_N$) are used to establish an initial connection, and the transmit end and the receive end are completely synchronized.

During the operation, at a first frame moment starting from an i moment, N switches (K1 to KN) are all turned on, N analog receive channels are all connected, and signals within a pilot timeslot of the first frame are received:

$$r^{(i)}(n) = w_1 * r_1^{(i)}(n) + w_2 * r_2^{(i)}(n) + \ldots w_N * r_N^{(i)}(n)$$

Then, within a pilot timeslot of frames from the second frame to the $(N+1)^{th}$ frame, one of the N analog channels corresponding to N antenna array elements is disconnected in sequence, and at the same time, signals at the other N−1 antenna array elements are normally received, to ensure that the backhaul system is still working properly during the process, so that different receive signals within the pilot timeslot of the N frames from the second frame to the $(N+1)^{th}$ frame can be obtained at the receive end.

$$r^{(i+1)}(n) = w_2 * r_2^{(i+1)}(n) + w_3 * r_3^{(i+1)}(n) + \ldots w_N * r_N^{(i+1)}(n)$$

$$r^{(i+2)}(n) = w_1 * r_1^{(i+2)}(n) + w_3 * r_3^{(i+2)}(n) + \ldots w_N * r_N^{(i+2)}(n)$$

...

$$r^{(i+N)}(n) = w_1 * r_1^{(i+N)}(n) + w_2 * r_2^{(i+N)}(n) + \ldots w_{N-1} * r_{N-1}^{(i+N-1)}(n)$$

Because the wireless channel between the transmit end and the receive end may be considered stable within the N+1 transmission frames, the foregoing N+1 receive pilot signal streams are as follows:

$$r_k^{(i)}(n) \approx r_k^{(l+k)}(n), k = 1, 2 \ldots N$$

An independently received equivalent signal corresponding to each of the N antenna array elements is obtained by calculating a difference between a received pilot signal in the first frame and a received pilot signal in each of the frames from the second frame to the $(N+1)^{th}$ frame:

$$\tilde{R}_1(n) = r^{(i)}(n) - r^{(i+1)}(n)$$

$$\tilde{R}_2(n) = r^{(i)}(n) - r^{(i+2)}(n)$$

...

$$\tilde{R}_N(n) = r^{(i)}(n) - r^{(i+N)}(n)$$

A group of new beamforming weights are obtained by means of adaptive resolving according to the independently received equivalent signal corresponding to each antenna array element, and the group of new beamforming weights are sent to a transmitter, so that the group of new beamforming weights are applied to both the transmit end and the receive end, so as to implement optimal pairing for transmit and receive signal beamforming.

During subsequent operation, the beamforming weights may be adaptively tracked and corrected in a cycle of the N+1 frames according to the foregoing method.

Figure 6:
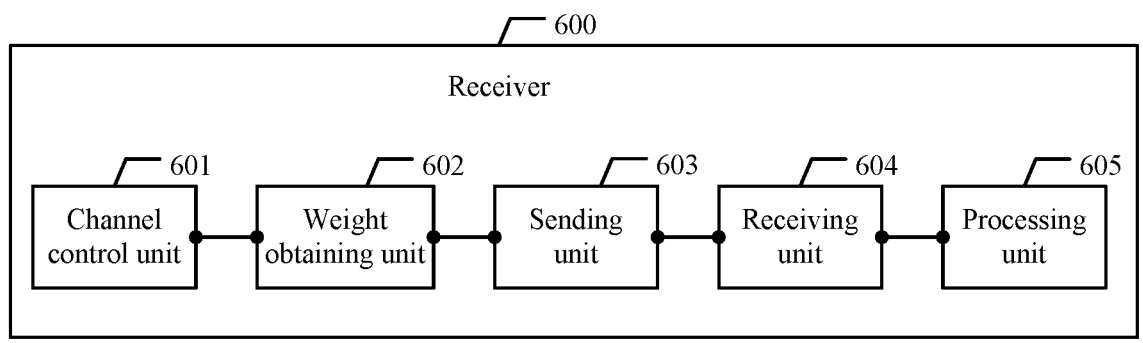
FIG. 6 is a schematic structural diagram of a receiver according to an embodiment of the present invention.

FIG. 6 is a schematic structural diagram of a receiver according to an embodiment of the present invention. The receiver in this embodiment of the present invention may be implemented in a device such as a base station or a terminal, and the receiver in this embodiment includes:

a channel control unit 601, configured to control, according to a preset rule, connection or disconnection of N analog channels corresponding to N antenna array elements, to obtain an independently received equivalent signal at each of the N antenna array elements, where N is a natural number greater than or equal to 2;

a weight obtaining unit 602, configured to obtain, based on the independently received equivalent signal at each of the N antenna array elements, a beamforming weight; and a sending unit 603, configured to send the beamforming weight to a transmitter. The beamforming weight is used by the transmitter to perform beamforming processing on a to-be-sent communications signal by using the beamforming weight.

Further, the receiver 600 may further include:

a receiving unit 604, configured to receive a communications signal from the transmitter, where the communications signal is a communications signal on which beamforming processing is performed by using the beamforming weight; and a processing unit 605, configured to perform, by using the beamforming weight, beamforming processing on the communications signal received by the N antenna array elements.

For example, the channel control unit may be implemented by a switch circuit disposed on an analog channel. The switch circuit may be a universal circuit in the prior art or a circuit to be produced in the future, and this is not limited herein. The weight obtaining unit and the processing unit may be implemented by a processor, and the processor may be a chip or another hardware entity such as a central processing unit CPU or a digital signal processor DSP. The receiving unit may be implemented by using a receiver circuit, and the receiver circuit may include at least one of a duplexer, a low noise amplifier, a frequency modulation circuit, or an analog to digital converter, and may further include an antenna. The sending unit may be implemented by using a transmitter circuit, and the transmitter circuit may include one of a duplexer, a power amplifier, a frequency modulation circuit, or a digital to analog converter, and may further include an antenna.

Further, the preset rule includes: first connecting the N analog channels, and then disconnecting a preset quantity of analog channels in sequence, where the preset quantity is less than N.

Further, a complete superimposed signal stream is obtained when the N analog channels are connected, a default superimposed signal stream is obtained when the preset quantity of analog channels are disconnected, and the obtaining, by the channel control unit 601, an independently received equivalent signal at each of the N antenna array elements includes:

obtaining, by the channel control unit 601, the independently received equivalent signal at each of the N antenna array elements by calculating a difference between the complete superimposed signal stream and each default superimposed signal stream.

Further, a connectivity control circuit is disposed on each of the N analog channels.

The receiver in this embodiment of the present invention may implement the method described in the embodiment shown in FIG. 3. For a technical implementation process and technical effects, refer to detailed descriptions of the embodiment shown in FIG. 3, and details are not described herein again.

Figure 7:
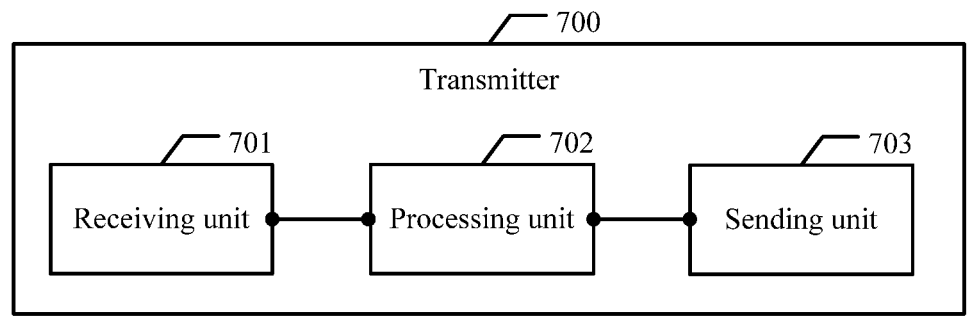
FIG. 7 is a schematic structural diagram of a transmitter according to an embodiment of the present invention.

FIG. 7 is a schematic structural diagram of a transmitter according to an embodiment of the present invention. The transmitter in this embodiment of the present invention may be implemented in a device such as a base station or a terminal, and the transmitter in this embodiment includes:

a receiving unit 701, configured to receive a second beamforming weight sent by a receiver;

a processing unit 702, configured to perform beamforming processing on a to-be-sent communications signal by using the second beamforming weight; and a sending unit 703, configured to send, by using N antenna array elements, the communications signal processed by using the second beamforming weight, where N is a natural number greater than or equal to 2.

For example, the processing unit may be implemented by a processor, and the processor may be a chip or another hardware entity such as a central processing unit CPU or a digital signal processor DSP. The receiving unit may be implemented by using a receiver circuit, and the receiver circuit may include at least one of a duplexer, a low noise amplifier, a frequency modulation circuit, or an analog to digital converter, and may further include an antenna. The sending unit may be implemented by using a transmitter circuit, and the transmitter circuit may include one of a duplexer, a power amplifier, a frequency modulation circuit, or a digital to analog converter, and may further include an antenna.

Specifically, the receiver may send the second beamforming weight to the transmitter immediately after obtaining the second beamforming weight by means of calculation. A specific method for sending the second beamforming weight to the transmitter may still be a method for sending a beamforming weight in a closed-loop ABF solution in the prior art. Optionally, obtaining of the second beamforming weight may start from an i moment and be performed periodically within N+1 frames.

Further, the processing unit 702 is further configured to: before the receiving unit 701 receives the second beamforming weight sent by the receiver, perform beamforming processing on the to-be-sent communications signal by using a first beamforming weight; and the sending unit 703 is further configured to send, by using the N antenna array elements, the communications signal processed by using the first beamforming weight.

The receiver in this embodiment of the present invention may implement the method described in the embodiment shown in FIG. 4. For a technical implementation process and technical effects, refer to detailed descriptions of the embodiment shown in FIG. 4, and details are not described herein again.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, read-only memory), a random access memory (RAM, random access memory), a magnetic disk, or an optical disc.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A beamforming method, comprising:
connecting or disconnecting N analog channels corresponding to N antenna array elements according to a preset rule, wherein the preset rule comprises first connecting the N analog channels, and then disconnecting a preset quantity of analog channels in sequence, wherein the preset quantity is less than N, wherein N is a natural number greater than or equal to 2;
obtaining an independently received equivalent signal at each of the N antenna array elements,
  wherein a complete superimposed signal stream is obtained when the N analog channels are connected a default superimposed signal stream is obtained when the preset quantity of analog channels are disconnected, and
  the obtaining the independently received equivalent signal at each of the N antenna array elements comprises:
    obtaining the independently received equivalent signal at each of the N antenna array elements by calculating a difference between the complete superimposed signal stream and each default superimposed signal stream;
obtaining a beamforming weight based on the independently received equivalent signal at each of the N antenna array elements; and
sending the beamforming weight to a transmitter.

2. The method according to claim 1, comprising:
receiving a communications signal from the transmitter, wherein the communications signal is a communications signal on which beamforming processing is performed by using the beamforming weight; and
performing, by using the beamforming weight, beamforming processing on the communications signal received by the N antenna array elements.

3. The method according to claim 1, wherein the preset quantity is 1.

4. The method according to claim 1, further comprising disconnecting a connectivity control circuit on each of the N analog channels.

5. A receiver, comprising:
a memory; and
a processor coupled to the memory and configured:
connect or disconnect N analog channels corresponding to N antenna array elements according to a preset rule, wherein the preset rule comprises first connecting the N analog channels, and then disconnecting a preset quantity of analog channels in sequence, wherein the preset quantity is less than N, wherein N is a natural number greater than or equal to 2;
obtain an independently received equivalent signal at each of the N antenna array elements, wherein
  a complete superimposed signal stream is obtained when the N analog channels are connected,
  a default superimposed signal stream is obtained when the preset quantity of analog channels are disconnected, and
  the processor configured to obtain the independently received equivalent signal at each of the N antenna array elements comprises the processor configured to:
    obtain the independently received equivalent signal at each of the N antenna array elements by calculating a difference between the complete superimposed signal stream and each default superimposed signal steam;
obtain a beamforming weight based on the independently received equivalent signal at each of the N antenna array elements; and
send the beamforming weight to a transmitter.

6. The receiver according to claim 5, wherein the processor is further configured to:
receive a communications signal from the transmitter, wherein the communications signal is a communications signal on which beamforming processing is performed by using the beamforming weight; and
perform, by using the beamforming weight, beamforming processing on the communications signal received by the N antenna array elements.

7. The receiver according to claim 5, wherein the preset quantity is 1.

8. The receiver according to claim 5, wherein the processor is further configured to connect or disconnect each of the N analog channels with a connectivity control circuit.

9. A transmitter, comprising:
a memory; and
a processor coupled to the memory and configured to:
  receive a second beamforming weight sent by a receiver;
  perform beamforming processing on a to-be-sent communications signal by using the second beamforming weight receiver according to an independently received equivalent signal at each antenna array element of N antenna array elements of the receiver, wherein N is a natural number greater than or equal to 2, and
    wherein a complete superimposed signal stream is obtained by the receiver when N analog channels corresponding to the N antenna array elements of the receiver are connected,
    a default superimposed signal stream is obtained when the preset quantity of analog channels are disconnected, and
    the receiver obtains the independently received equivalent signal at each of the N antenna array elements of the receiver by
      obtaining the independently received equivalent signal at each of the N antenna array elements of the receiver by
      calculating a difference between the complete superimposed signal stream; and
  send, by using N antenna array elements, the communications signal processed by using the second beamforming weight.

10. The transmitter according to claim 9, wherein the processor is further configured to:
perform beamforming processing on the to-be-sent communications signal by using a first beamforming weight before the second beamforming weight sent by the receiver is received; and
send, by using the N antenna array elements, the communications signal processed by using the first beamforming weight.

* * * * *